US009684598B1

(12) United States Patent
Devor et al.

(10) Patent No.: US 9,684,598 B1
(45) Date of Patent: Jun. 20, 2017

(54) METHOD AND APPARATUS FOR FAST DISTRIBUTED CACHE RE-SYNC AFTER NODE DISCONNECTION

(71) Applicant: EMC Corporation, Hopkinton, MA (US)

(72) Inventors: Orly Devor, Zichron Yaakov (IL); Lior Zilpa, Bat Yam (IL); Michael Deift, Ramat Gan (IL); Eli Ginot, Tel Aviv (IL); Philip Derbeko, Modiin (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 310 days.

(21) Appl. No.: 14/502,370

(22) Filed: Sep. 30, 2014

(51) Int. Cl.
*G06F 12/08* (2016.01)
*G06F 12/0817* (2016.01)

(52) U.S. Cl.
CPC .... *G06F 12/0824* (2013.01); *G06F 2212/314* (2013.01)

(58) Field of Classification Search
CPC ...................... G06F 12/0824; G06F 2212/314
See application file for complete search history.

(56) References Cited

U.S. PATENT DOCUMENTS 7,120,824 B2 * 10/2006 Burton ................ G06F 11/2058 707/999.01
2004/0044850 A1 * 3/2004 George ............... G06F 12/0835 711/131
2005/0108191 A1 * 5/2005 Iyengar ............ G06F 17/30902

OTHER PUBLICATIONS

Jim Handy. 1998. The Cache Memory Book. Academic Press Prof., Inc., San Diego, CA, USA.*

* cited by examiner

*Primary Examiner* — David X Yi
*Assistant Examiner* — Ramon A Mercado
(74) *Attorney, Agent, or Firm* — Krishnendu Gupta; Robert Kevin Perkins

(57) ABSTRACT

Example embodiments of the present invention relate to a method, a system, and a computer program product for re-syncing a distributed cache after node disconnection. The method includes stopping cache coherency among a plurality of nodes at times a first node among the plurality of nodes is in a disconnected state and determining the first node is no longer in the disconnected state. A second cache at a second node then may dump portions of the second cache at the second node inconsistent with changes made to a first cache at the first node at times the first node was in the disconnected state.

9 Claims, 9 Drawing Sheets

LOGICALLY DIVIDE CACHE INTO CHUNKS HAVING GRANULARITY 730
MAP CHUNKS TO BITMAP ACCORDING TO GRANULARITY 735
DECREASE GRANULARITY OF CHUNKS 755
RESET BITS IN BITMAP ACC'ING TO DEC'ED GRANULARITY 760
SET BIT FOR CHUNK CHANGED BY PROC'ING WRITE I/O 740
1ST NODE RECONNECTED 745
NO 747
YES 748
1ST CHANGE THRESHOLD? 750
NO 752
YES 753
SEND BITMAP OF CHANGES MADE AT 1ST NODE TO 2ND NODE 765
2ND CHANGE THRESHOLD ? 770
NO 772
YES 773
DUMP CHUNKS OF 2ND CACHE AT 2ND NODE MARKED IN BITMAP 775
DUMP ENTIRETY OF 2ND CACHE AT 2ND NODE RGRDLESS OF BITMAP 785

METHOD AND APPARATUS FOR FAST DISTRIBUTED CACHE RE-SYNC AFTER NODE DISCONNECTION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATION

This Application is related to U.S. patent application Ser. No. 14/319,343 entitled "CACHE CONSISTENCY" filed on Jun. 30, 2014 the teachings of which application are hereby incorporated herein by reference in their entirety.

TECHNICAL FIELD

This application relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

Example embodiments of the present invention relate to a method, a system, and a computer program product for re-syncing a distributed cache after node disconnection. The method includes stopping cache coherency among a plurality of nodes at times a first node among the plurality of nodes is in a disconnected state and determining the first node is no longer in the disconnected state. A second cache at a second node then may dump portions of the second cache at the second node inconsistent with changes made to a first cache at the first node at times the first node was in the disconnected state.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
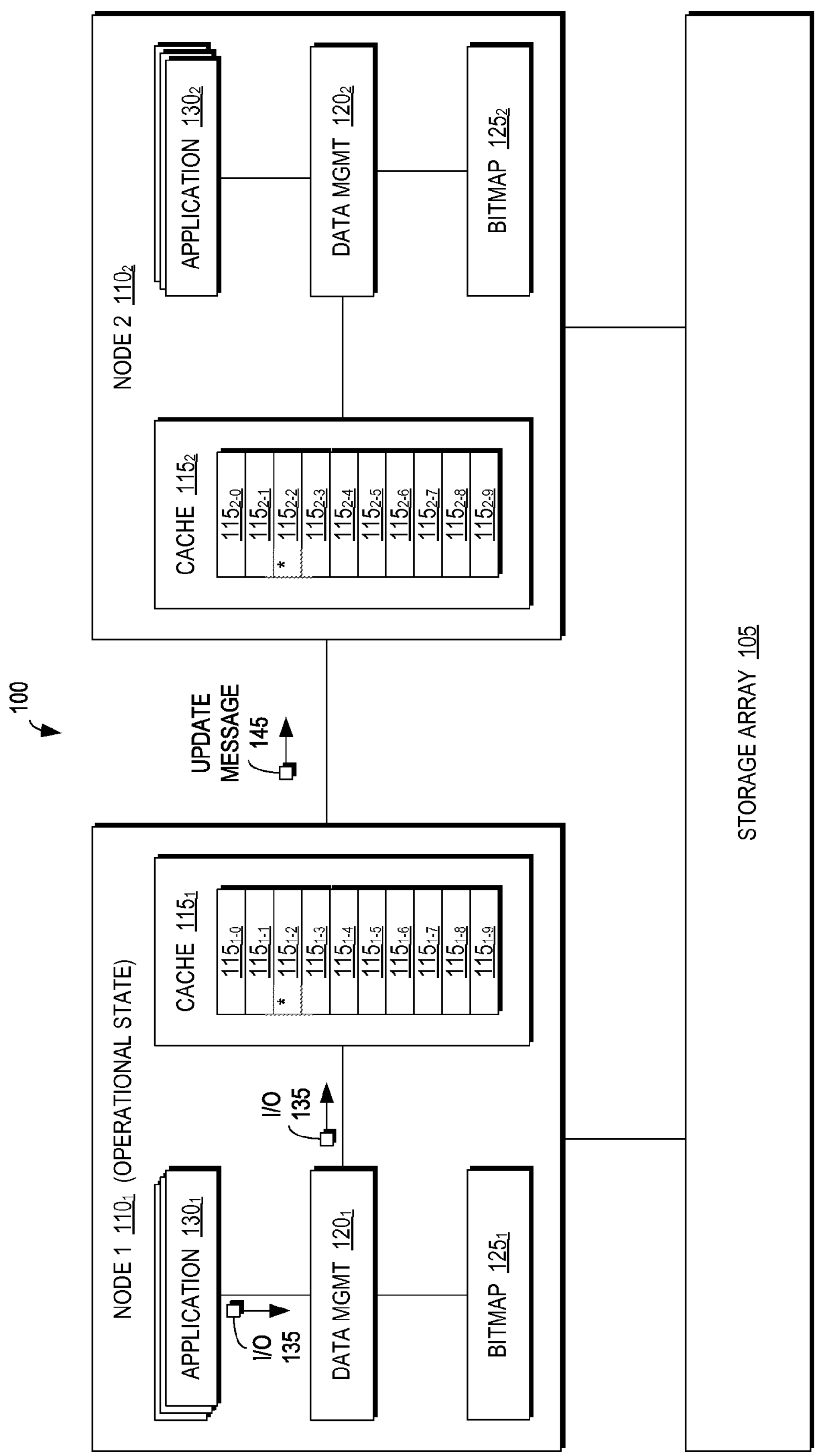
FIG. 1 is a block diagram illustrating a data storage system including a distributed cache at a first time with a first node in an operational state according to an example embodiment of the present invention.

Traditionally, data storage systems employ distributed cache in active-active cluster implementations. Generally, a distributed cache requires synchronization of content across member nodes of an active-active cluster implementation. Conventionally, a common solution for synchronizing distributed cache is using clock synchronization between member nodes of an active-active cluster implementation. Typically, clock synchronization enables time-stamping for correct ordering of data written to distributed cache. Generally, clock synchronization enables a data storage system to pause caching and use timestamps to order the I/O requests in a correct order to know what the right data is, however, the clock synchronization degrades performance of the data storage system. Typically, clock synchronization increases the complexity of a data storage system. Conventionally, enabling a data storage system to maintain a consistent distributed cache without clock synchronization would be beneficial to the performance of the data storage system.

As understood in the art, a typical problem with active-active clusters is that if the first node reads data from the storage system and then the second node writes new data to the same location, the cache on the first node should be aware that the data was updated. Therefore, as described in U.S. patent application Ser. No. 14/319,343 entitled "CACHE CONSISTENCY" filed on Jun. 30, 2014 the teachings of which application are hereby incorporated herein by reference in their entirety, example embodiments of the present invention provide cache coherency across each node of a distributed cache. Cache coherency is a method of synchronizing the cache between nodes in an active-active cluster. It should be noted, however, that example embodiments of the present invention relate to a write through cache in which a "master" version of the data is always on the storage system (i.e., an application writes data and the data is written to the storage system and then acknowledged by to the application) which is different than a write back cache in which a "master" version of the data may be in the cache (i.e., where data is written to cache and acknowledged to application, with the data later being written to the storage system).

However, the use of a write through cache poses a problem when one of the nodes or communication links between nodes is down and requires complex synchronization algorithms. For example, in a distributed cache with two nodes synchronizing I/O operations (e.g., reads and writes), when the first node receives a write operation, it has to notify the second node that is it updating the affected chunk of data. However, until the second node acknowledges that it updated (or, in certain embodiments, does not cache the data), the first cannot acknowledge the write operation to issuing application. Here, the first node may hang is the second node fails or the communications link between the first node and the second node fails. Traditionally, the entire cache was invalidated after disconnection.

Example embodiments of the present invention provide fast synchronization after disconnection of a node (e.g., by node failure or communications link failure). In a preferred embodiment, the algorithm keeps the cache as warm (i.e., synchronized) as possible by identifying a disconnection and, at each node, keeping a list of write I/O requests. In certain embodiments, as the list keeps growing, the granularity is increased, as will be described in greater detail below (ultimately, the entire logical unit (LU) may be marked as changed). Once the disconnected node reconnects, or the failed communications link is restored, the bitmap of write I/O request changes is requested from each other node with which the connection is reestablished. Upon receiving the bitmap (i.e., list of changes), the node may invalidate and evict the data from its cache for the marked locations. Thus, after reconnection, caches do not include data that was written on other nodes. Caching then may continue.

FIG. 1 is a block diagram illustrating a data storage system 100 including a distributed cache at a first time with a first node 110$_1$ in an operational state according to an example embodiment of the present invention. As illustrated in FIG. 1, the data storage system 100 includes a first node 110$_1$, a second node 110$_2$, and a storage array 105. The first and second nodes 110$_1$, 110$_2$ (110 generally) each may include a data management module 120$_1$, 120$_2$, a bitmap 125$_1$, 125$_2$ (125 generally) (as will be discussed below with reference to FIG. 2), and a local cache 115$_1$, 115$_2$ for caching data from the storage array 105 for use by respective applications 130$_1$, 130$_2$ (130 generally) operating on the nodes 110. The nodes 110 may be in communication with each other and the storage array 105 and may provide a distributed cache. While FIG. 1 only illustrates two nodes 110, those of ordinary skill in the art will appreciate that example embodiments of the present invention are equally applicable to any number of a plurality of nodes where the second node 110$_2$ is any or all of the nodes of the plurality of nodes other than the first node 110$_1$.

Further, physical and logical storage provided by the storage system 100 may be shared across each node 110, thereby enabling the nodes 110 in the cluster to access such storage resources on the same storage system 100. In certain embodiments, the storage system 100 may be one or more external storage arrays, such as VMAX® and VNX® by EMC Corporation of Hopkinton, Mass. Further, in certain embodiments, the cache 115 may be a Flash card, such as XtremCache™ by EMC Corporation of Hopkinton, Mass., or any other kinds of cache.

As illustrated in FIG. 1, with the first node 110$_1$ in an operational state, an application 130$_1$ operating on the first node 110$_1$ may send an I/O 135 to the data management module 120$_1$ which may, in turn, send the I/O 135 to the first node's local cache 115$_1$. As illustrated in FIG. 1, the I/O 135 is a write I/O and causes an update to be made to cache location 115$_{1-2}$ of the first node's local cache 115$_1$ (as indicated by the asterisk (*)).

As a result of this update, the first node 110$_1$, such as via the data management module 120$_1$, sends an update message 145 to the second node 110$_2$, such as to its data management module 120$_2$, to update the cache location 115$_{2-2}$ of the second node's local cache 115$_2$ corresponding to the changed cache location 115$_{1-2}$ of the first node's local cache 115$_1$. The local caches 115 at the nodes 110 are now synchronized for cache coherency.

Figure 2:
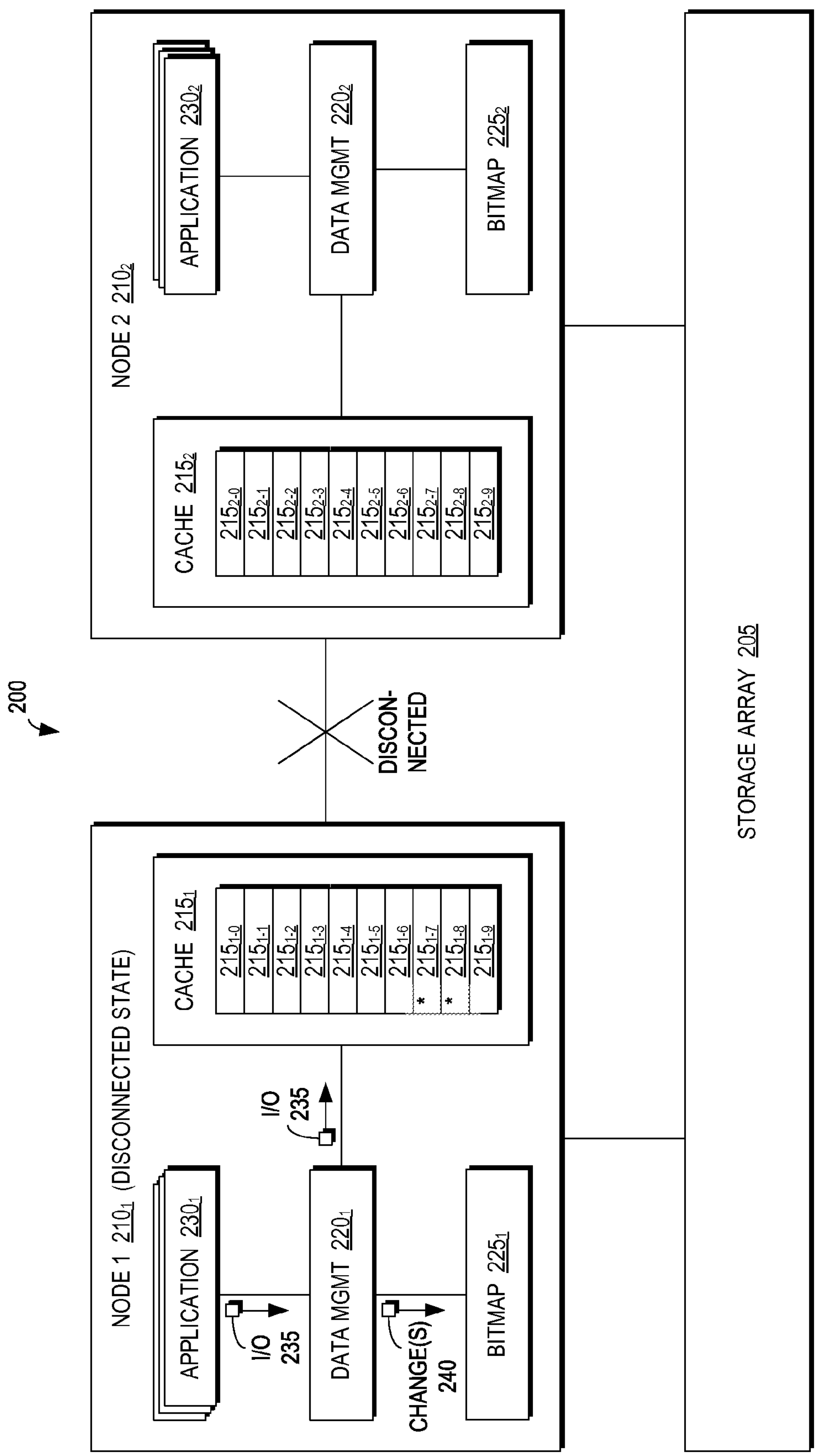
FIG. 2 is a block diagram illustrating a data storage system including a distributed cache at a second time with a first node in a disconnected state according to an example embodiment of the present invention.

FIG. 2 is a block diagram illustrating a data storage system 200 including a distributed cache at a second time with a first node 210$_1$ in a disconnected state according to an example embodiment of the present invention. As illustrated in FIG. 2, with the first node 210$_1$ in a disconnected state, either as a result of node failure or communications link failure, an application 230$_1$ operating on the first node 210$_1$ may send an I/O 235 to the data management module 220$_1$ which may, in turn, send the I/O 235 to the first node's local cache 215$_1$. As illustrated in FIG. 2, the I/O 235 is a write I/O and causes updates to be made to cache locations 215$_{1-7}$, 215$_{1-8}$ of the first node's local cache 215$_1$ (as indicated by the asterisks (*)). However, in contrast to the discussion above with reference to FIG. 1, as a result of the node or communication link failure, the first node 210$_1$ is unable to send an update message (e.g., update message 145 of FIG. 1) to the second node 210$_2$ to update the cache locations 215$_{1-7}$, 215$_{1-8}$ of the second node's local cache 215$_2$ corresponding to the changed cache locations 215$_{1-7}$, 215$_{1-8}$ of the first node's local cache 215$_1$.

As described above, in traditional active-active distributed caches, upon a node disconnection, the nodes may stop caching and dump the cache as there is no unique data in the caches (i.e., the "master" data is at the storage array). As understood in the art, stopping caching until all nodes begin synchronizing causes the storage system to take a significant performance hit. Another option is to stop all I/O operations until the failed node (e.g., the first node 210$_1$) responds because read operations on the second node 210$_2$ may not be accurate as there is a possibility that the first node 210$_1$ updated the data that the second node 210$_2$ is trying to read before the change was synchronized between the nodes 210 (i.e., the second node 210$_2$ has stale data in its cache 215$_2$). However, this option is not desirable as node failure can be frequent and taking the entire storage system 200 offline is unnecessarily disruptive.

Rather, example embodiments of the present invention take a more balanced approach and allow the nodes 210 to continue to work while a node (e.g., the first node $\mathbf{210}_1$) is in a disconnected state.

Figure 4:
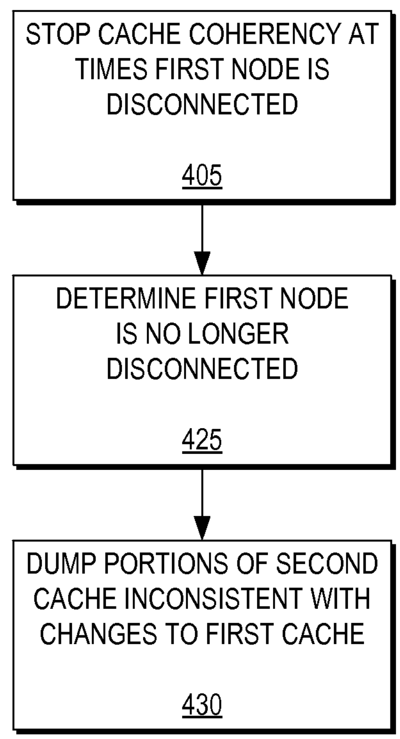
FIG. 4 is a flow diagram illustrating a method for re-syncing a distributed cache after node disconnection according to an example embodiment of the present invention.

FIG. 4 is a flow diagram illustrating a method for re-syncing a distributed cache after node disconnection according to an example embodiment of the present invention. FIG. 4 may be described in conjunction with FIG. 2.

As illustrated in FIGS. 2 and 4, when the second node $\mathbf{210}_2$ determines that the first node $\mathbf{210}_1$ is in a disconnected state, the second node $\mathbf{210}_2$ may stop cache coherency (e.g., among the plurality of nodes 210) (405). As will be described in greater detail below, in certain embodiments, the second node $\mathbf{210}_2$ may later determine that the first node $\mathbf{210}_1$ is no longer in the disconnected state (425) and then dump from the second node's local cache $\mathbf{215}_2$ portions inconsistent with changes made to the first node's local cache $\mathbf{215}_1$ at times the first node $\mathbf{210}_1$ was in the disconnected state (430). In certain embodiments, cache coherency may remain stopped until the nodes 210 resynchronize or until it is determined that the node in the disconnected state (e.g., the first node $\mathbf{210}_1$) has failed.

Figure 5:
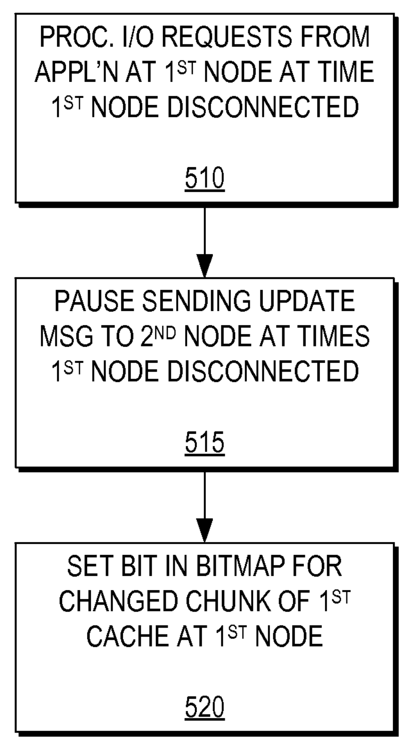
FIG. 5 is a flow diagram illustrating a method for performing I/O operations while a node of a distributed cache is in a disconnected state according to an example embodiment of the present invention.

FIG. 5 is a flow diagram illustrating a method for performing I/O operations while a node of a distributed cache is in a disconnected state according to an example embodiment of the present invention. FIG. 5 may be described in conjunction with FIG. 2.

As illustrated in FIGS. 2 and 5, the data management module $\mathbf{220}_1$ for the first node $\mathbf{210}_1$ in the disconnected state may collect all the I/O operations (e.g., write operations) by processing I/O requests 235 received from an application $\mathbf{230}_1$ at times the first node $\mathbf{210}_1$ is in the disconnected state (510) thereby causing changes to be made to the local cache $\mathbf{215}_1$ at the first node $\mathbf{210}_1$ at times the first node $\mathbf{210}_1$ is in the disconnected state.

Then, unlike in normal cache coherency operation, the data management module $\mathbf{220}_1$ may pause sending an update message (e.g., update message 145 of FIG. 1) to the second node $\mathbf{210}_2$ at times the first node $\mathbf{210}_1$ is in the disconnected state (515). Pausing sending the update message causes changes made to the local cache $\mathbf{215}_1$ at the first node $\mathbf{210}_1$ at times the first node $\mathbf{210}_1$ is in the disconnected state not to be updated in the local cache $\mathbf{215}_2$ at the second node $\mathbf{210}_2$.

The data management module $\mathbf{220}_1$ then may set a bit in a bitmap $\mathbf{225}_1$ for a respective chunk of the local cache $\mathbf{215}_1$ at the first node $\mathbf{210}_1$ changed by processing the write I/O 235 (520). Therefore, as illustrated in FIG. 2, processing the I/O 235 has caused changes to be made to the local cache $\mathbf{215}_1$ at locations $\mathbf{215}_{1\text{-}7}$, $\mathbf{215}_{1\text{-}8}$ and the data management module $\mathbf{220}_1$ tracks those changes in a bitmap $\mathbf{225}_1$. Similarly, although not illustrated in FIG. 2 for simplicity, the second node $\mathbf{210}_2$ also tracks the changes made to its local cache $\mathbf{215}_2$.

Figure 3:
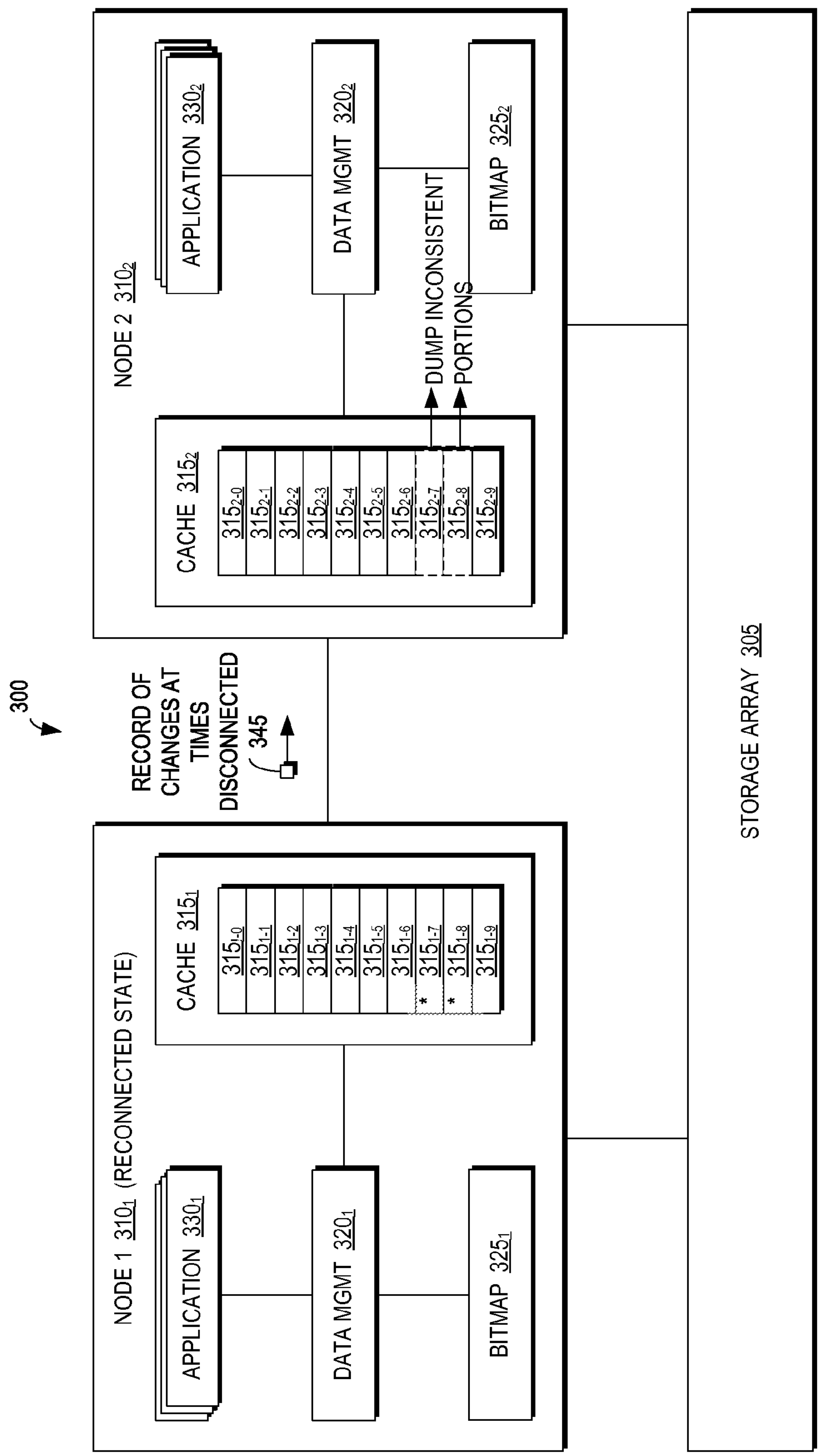
FIG. 3 is a block diagram illustrating a data storage system including a distributed cache at a third time with a first node in a reconnected state according to an example embodiment of the present invention.

FIG. 3 is a block diagram illustrating a data storage system 300 including a distributed cache at a third time with a first node $\mathbf{310}_1$ in a reconnected state according to an example embodiment of the present invention. Once the first node $\mathbf{310}_1$ reconnects with the second node $\mathbf{310}_2$, or the second node $\mathbf{310}_2$ determines that it is the only node 310 in cluster (i.e., the disconnected node (e.g., the first node $\mathbf{310}_1$) has been excluded from cluster membership), the nodes 310 send their change tracking bitmaps 325 to one another. For simplicity, as mentioned above, the figures illustrate changes made at only the first node $\mathbf{310}_1$ (i.e., changes to the local cache $\mathbf{315}_1$ for the first node $\mathbf{310}_1$ at locations $\mathbf{315}_{1\text{-}7}$ and $\mathbf{315}_{1\text{-}8}$); however, one of ordinary skill in the art will appreciate that any of the nodes 310 may have changes made to their respective local cache 315 and that those changes may be distributed to all other nodes 310 in the cluster.

Figure 6:
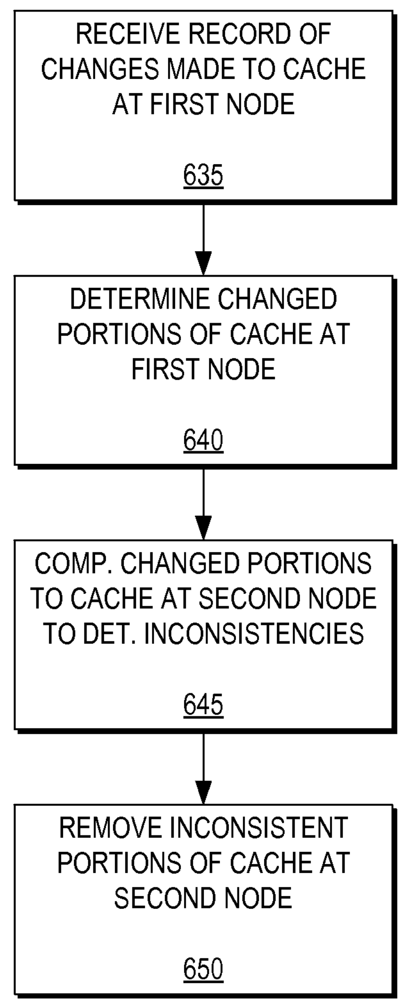
FIG. 6 is a flow diagram illustrating a method for re-syncing a distributed cache when the disconnected node is no longer in the disconnected state according to an example embodiment of the present invention.

FIG. 6 is a flow diagram illustrating a method for re-syncing a distributed cache when the disconnected node is no longer in the disconnected state according to an example embodiment of the present invention. FIG. 6 may be described in conjunction with FIG. 3.

As illustrated in FIGS. 3 and 6, to dump from the second node's local cache $\mathbf{315}_2$ portions inconsistent with changes made to the first node's local cache $\mathbf{315}_1$ at times the first node $\mathbf{310}_1$ was in the disconnected state, the data management module $\mathbf{320}_1$ for the first node $\mathbf{310}_1$ may distribute its bitmap $\mathbf{325}_1$ as a record of changes 345 (635) made while the first node $\mathbf{310}_1$ was in the disconnected state (as illustrated in FIG. 2) to all other nodes 310 in the cluster (here, the second node $\mathbf{310}_2$). Upon receiving the records of changes 345, the data management module $\mathbf{320}_2$ at the second node $\mathbf{310}_2$ may determine portions of the local cache $\mathbf{315}_1$ at the first node $\mathbf{310}_1$ that were changed (640) according to processing the I/O requests received from the application at the first node at times the first node is in the disconnected state (as described above with reference to FIG. 2).

The data management module $\mathbf{320}_2$ at the second node $\mathbf{310}_2$ then may compare the changed portions of the local cache $\mathbf{315}_1$ at the first node $\mathbf{310}_1$ to respective portions of the local cache $\mathbf{315}_2$ at the second node $\mathbf{310}_2$ to determine portions of the local cache $\mathbf{315}_2$ at the second node $\mathbf{310}_2$ that are inconsistent with the changes made to the local cache $\mathbf{315}_1$ at the first node $\mathbf{310}_1$ (645). Finally, the data management module $\mathbf{320}_2$ at the second node $\mathbf{310}_2$ may remove from the local cache $\mathbf{315}_2$ at the second node $\mathbf{310}_2$ the portions of the local cache $\mathbf{315}_2$ at the second node $\mathbf{310}_2$ that are inconsistent with the changes made to the local cache $\mathbf{315}_1$ at the first node $\mathbf{310}_1$ (650).

For example, as illustrated in FIG. 3, the local cache $\mathbf{315}_1$ at the first node $\mathbf{310}_1$ was changed at locations $\mathbf{315}_{1\text{-}7}$ and $\mathbf{315}_{1\text{-}8}$ while the first node $\mathbf{310}_1$ was in a disconnected state (as described above with reference to FIG. 2). A record of those changes 345 may be sent from the data management module $\mathbf{320}_1$ for the first node $\mathbf{310}_1$ to the data management module $\mathbf{320}_2$ for the second node $\mathbf{320}_2$ which may, in turn, determine that locations $\mathbf{315}_{1\text{-}7}$ and $\mathbf{315}_{1\text{-}8}$ in the local cache $\mathbf{315}_1$ at the first node $\mathbf{310}_1$ were changed and compare those changes to the corresponding locations $\mathbf{315}_{2\text{-}7}$ and $\mathbf{315}_{2\text{-}8}$ in the local cache $\mathbf{315}_2$ at the second node $\mathbf{310}_2$. As illustrated in FIG. 3, the data management module $\mathbf{320}_2$ for the second node $\mathbf{320}_2$ may determine that locations $\mathbf{315}_{2\text{-}7}$ and $\mathbf{315}_{2\text{-}8}$ in the local cache $\mathbf{315}_2$ at the second node $\mathbf{310}_2$ are now inconsistent with that locations $\mathbf{315}_{1\text{-}7}$ and $\mathbf{315}_{1\text{-}8}$ in the local cache $\mathbf{315}_1$ at the first node $\mathbf{310}_1$ (as indicated by the hashed outline of locations $\mathbf{315}_{2\text{-}7}$ and $\mathbf{315}_{2\text{-}8}$ in the local cache $\mathbf{315}_2$ at the second node $\mathbf{310}_2$) and may dump the inconsistent portions from the local cache $\mathbf{315}_2$ at the second node $\mathbf{310}_2$.

Figure 7:
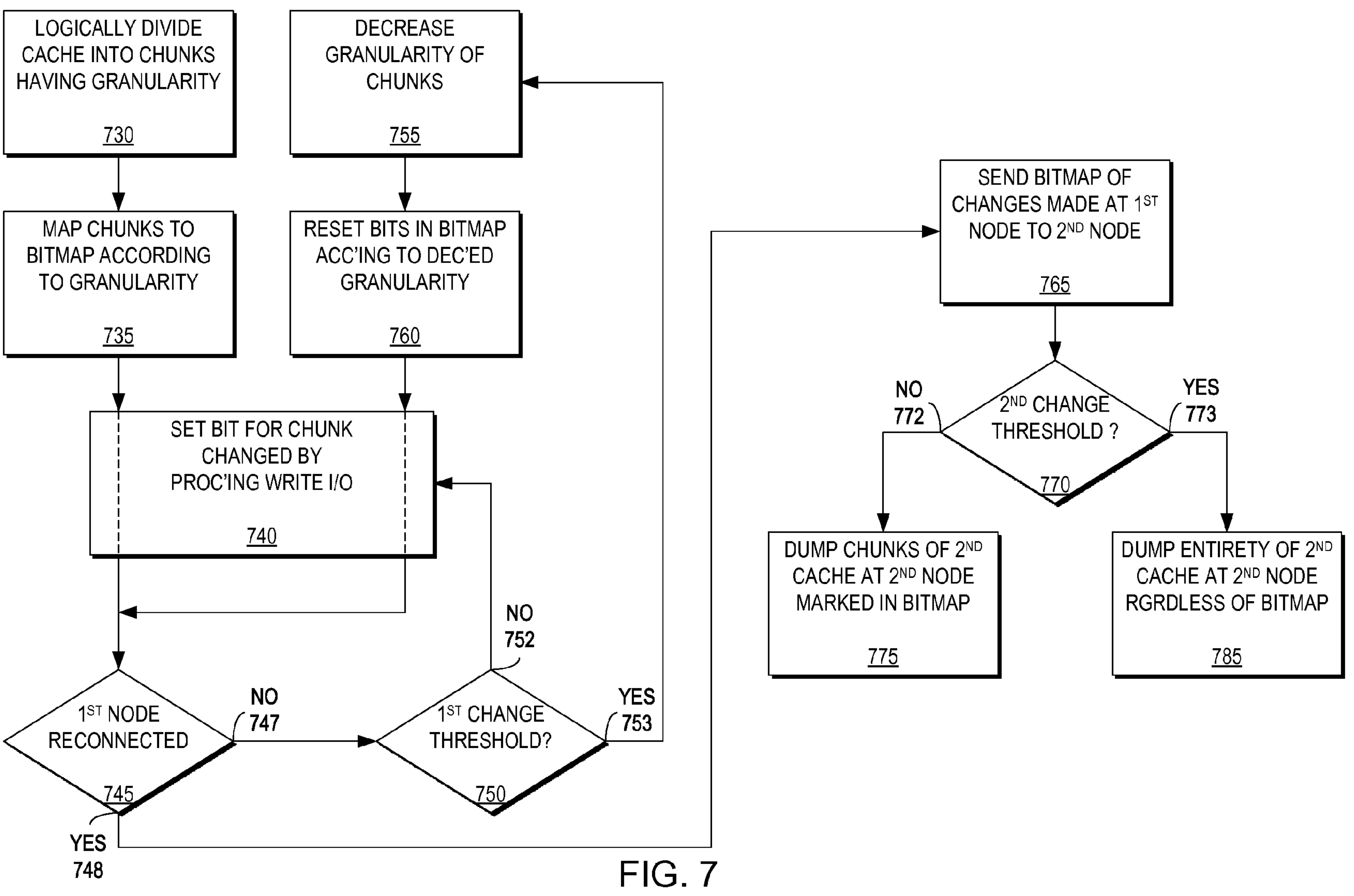
FIG. 7 is a flow diagram illustrating a method for changing chunk granularity for tracking cache changes according to an example embodiment of the present invention.

FIG. 7 is a flow diagram illustrating a method for changing chunk granularity for tracking cache changes according to an example embodiment of the present invention. FIG. 7 may be described in conjunction with FIGS. 2 and 3.

One of ordinary skill in the art will appreciate that extended downtime of a node (e.g., the first node $\mathbf{210}_1$ of FIG. 2) could fill the memory available for the bitmap $\mathbf{225}_1$. Accordingly, in a preferred embodiment, the cache $\mathbf{215}_1$ may be logically divided into a plurality of chunks having a particular granularity (e.g., 1 MB) (730). The bitmap $\mathbf{225}_1$ then may be mapped to the cache so that the bitmap $\mathbf{225}_1$ may be marked on a chunk by chunk basis (i.e., if an I/O 235 writes to chunk the bit for that chunk is marked) (735). As described above, the data management module $220_1$ at the first node $210_1$ may process I/Os 235 and set a bit in the bitmap $225_1$ corresponding to the one or more chunks of the cache $215_1$ changed by processing the I/O 235 (740).

The data management module $220_1$ at the first node $210_1$ then may continually monitor for whether the first node $210_1$ has reconnected (745). If the first node $210_1$ has not reconnected (747), the data management module $220_1$ at the first node $210_1$ then may determine whether a number of changes made to the cache $215_1$ exceeds a threshold (750) requiring a change in the granularity of the chunks. If the threshold has not been met (752), the data management module $220_1$ at the first node $210_1$ may continue to set bits in the bitmap $225_1$ as I/Os 235 are processed to reflect chunks of the cache $215_1$ changed by processing the I/O 235 (740).

However, if the threshold has been met (753), the data management module $220_1$ at the first node $210_1$ may decrease the granularity of the chunks (e.g., 1 MB chunks to 1 GB chunks) (755) and reset the bits in the bitmap $225_1$ according to the decreased granularity (760). Losing granularity was result in the local cache $215_2$ at the second node $210_2$ dumping more data than under higher granularity after reconnection; however, the tradeoff is that some cache data can be retained after reconnection rather than having to dump the whole cache $215_2$. As described above, the data management module $220_1$ at the first node $210_1$ may process I/Os 235 and set a bit in the bitmap $225_1$ (according to the decreased granularity) corresponding to the one or more chunks of the cache $215_1$ changed by processing the I/O 235 (740).

If the data management module $320_1$ at the first node $310_1$ determines that the first node $310_1$ has reconnected to the cluster (748), the data management module $320_1$ at the first node $310_1$ may send the bitmap $325_1$ as a records of changes 345 made at times the first node $310_1$ was disconnected to the data management module $320_2$ at the second node $310_2$ (765). The data management module $320_2$ at the second node $310_2$ then may determine whether a number of inconsistencies between the local cache $315_1$ at the first node $310_1$ and the local cache $315_2$ at the second node $310_2$ exceeds a threshold such that dumping the entire local cache $315_2$ at the second node $310_2$ should be performed regardless of the record of changes 345 (770). If the threshold has not been met (772), the data management module $320_2$ at the second node $310_2$ may dump the chunks of the local cache $315_2$ at the second node $310_2$ marked in the bitmap $325_1$ as indicated by the records of changes 345 (775). Otherwise, if the threshold has been met (773), the data management module $320_2$ at the second node $310_2$ may dump the entirety of the local cache $315_2$ at the second node $310_2$ regardless of the record of changes 345 (785).

It should be understood that any data dumped from the local cache $315_2$ at the second node $310_2$ may be recached from the storage array 305 at a different time or, if a host tries to access the data, the second node $310_2$ may bring it in from the storage array 305 and put it in the local cache $315_2$ at the second node $310_2$. Although dumping data from the local cache $315_2$ at the second node $310_2$ may decrease short term performance, the long term benefits are greater.

Further, it should be understood that example embodiments of the present invention may operate under one or more of the following assumptions. First, it is likely that a node operating in a disconnected state is a transient or temporary occurrence. Therefore, the number of writes and/or updates performed during this finite period is likely low compared to an entire cache. Therefore, storage systems according to example embodiments of the present invention may pay a performance penalty at times the disconnected node is in the disconnected state. However, it is likely that most of the cache stays intact and that only a small portion of the cache will need to be synchronized and/or recached at a different time.

Figure 8:
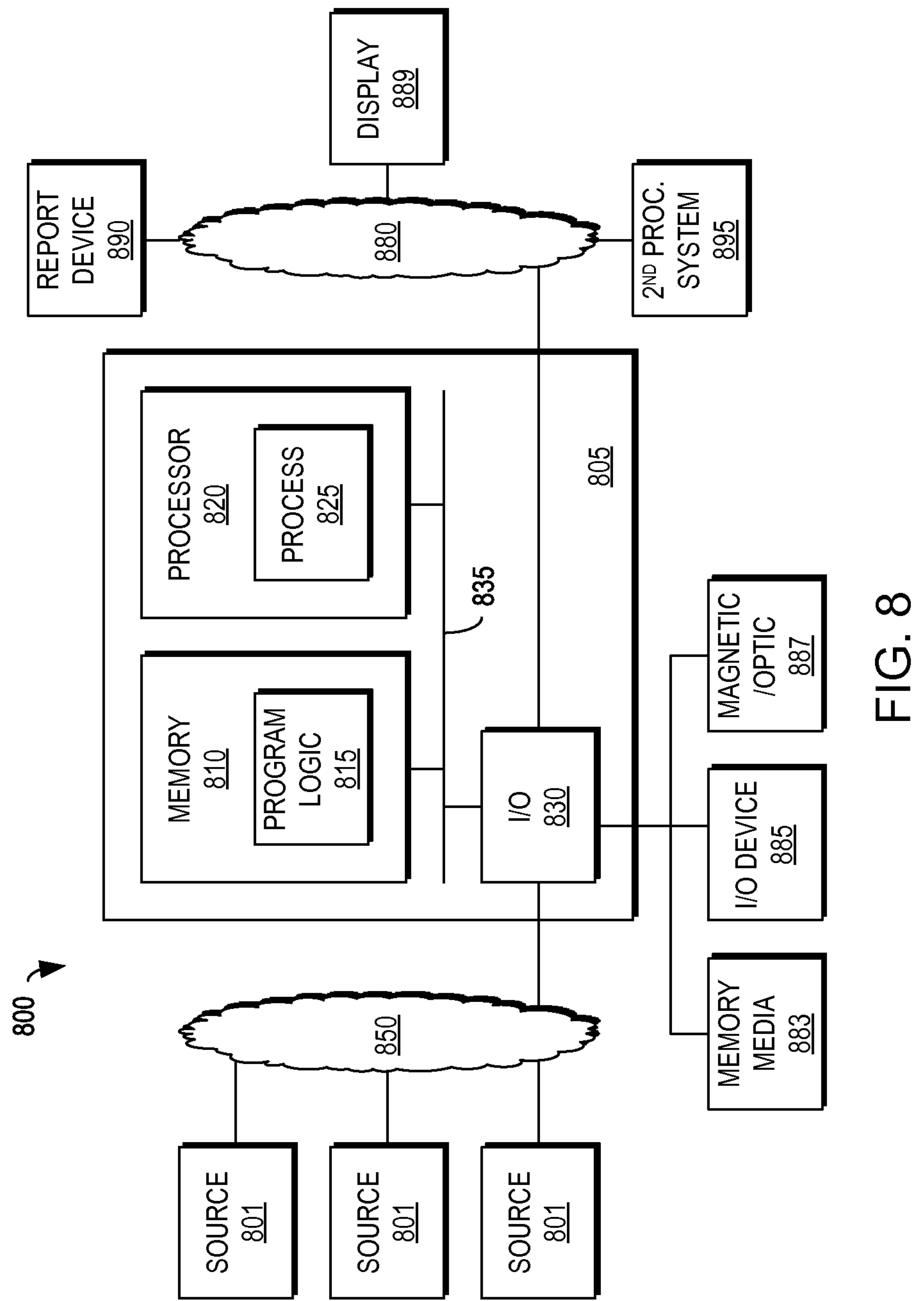
FIG. 8 is a block diagram of an apparatus according to example embodiment of the present invention.

FIG. 8 is a block diagram of an example embodiment apparatus 805 according to the present invention. The apparatus 805 may be part of a system 800 and includes memory 810 storing program logic 815, a processor 820 for executing a process 825, and a communications I/O interface 830, connected via a bus 835.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 8, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 9:
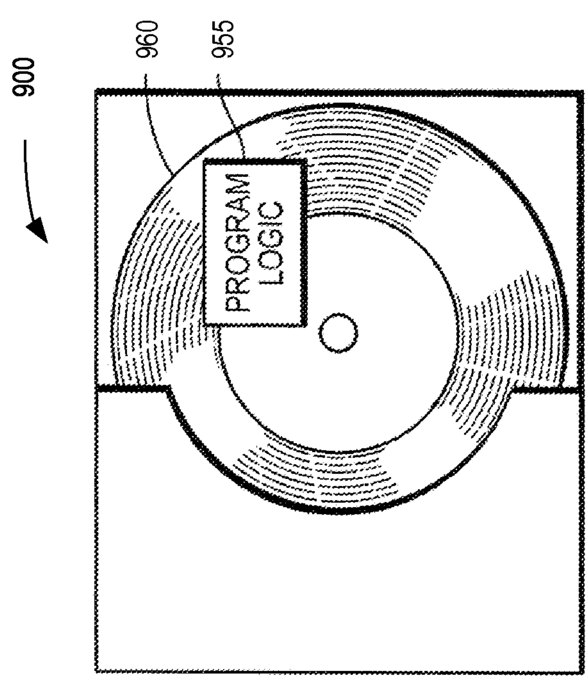
FIG. 9 is an illustration of computer program code according to an example embodiment of the present invention.

FIG. 9 shows program logic 955 embodied on a computer-readable medium 960 as shown, and wherein the logic 955 is encoded in computer-executable code configured for carrying out the methods of this invention, thereby forming a computer program product 900.

The logic for carrying out the method may be embodied as part of the aforementioned system, which is useful for carrying out a method described with reference to embodiments shown. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A method comprising:

stopping cache coherency among a plurality of nodes at times a first node among the plurality of nodes is in a disconnected state, wherein the stopping includes a pause in sending an update message to a second node among the plurality of nodes while in the disconnected state, wherein the pause causes changes made to the first cache which are not updated in a second cache at the second node during the disconnected state, the first cache and the second cache comprise a distributed write-through cache;

processing a write request received from an application at the first node at times the first node is in the disconnected state, wherein the processing the write request causes a bit to be set in a bitmap for a respective chunk of the first cache, wherein setting the bit includes allocating the first cache as a plurality of chunks having a granularity and mapping the plurality of chunks to the bitmap according to the granularity, wherein the processing, when a number of changes made to the first cache meets a first change threshold, causes a decreasing of the granularity of the chunks at which the bitmap is allocated, and resetting set bits in the bitmap according to the decreased granularity of the chunks;

determining the first node is no longer in the disconnected state; and dumping from the second cache at a second node portions of the second cache at the second node inconsistent with changes made to the first cache at the first node at times the first node was in the disconnected state, wherein the dumping including comparing the changed portions of the first cache to respective portions of the second cache to determine the portions of the second cache that are inconsisten with the changes made to the first cache, and removing from the second cache the portions of the second cache that are inconsistent with the changes made to the first cache.

2. The method of claim 1 wherein decreasing the granularity of the chunks at which the bitmap is allocated comprises increasing the chunk size; and wherein resetting the set bits in the bitmap according to the decreased granularity of the chunks comprises setting bits for respective increased-sized chunks according to whether the increased-sized chunk represents one or more chunks for which the bit was set in the bitmap.

3. The method of claim 1 wherein the number of changes made to the first cache at the first node exceeds a second change threshold, the method further comprising dumping from the second cache at the second node all portions of the second cache at the second node.

4. A system comprising:

a storage system;

a plurality of nodes configured to provide cache coherency among the plurality of nodes; and computer program code that when executed on a process or a computer causes the computer to perform the operations of:

stopping cache coherency among the plurality of nodes at times a first node among the plurality of nodes is in a disconnected state, wherein the stopping includes a pause in sending an update message to a second node among the plurality of nodes while in the disconnected state, wherein the pause causes changes made to the first cache which are not updated in a second cache at the second node during the disconnected state, the first cache and the second cache comprise a distributed write-through cache;

processing a write request received from an application at the first node at times the first node is in the disconnected state, wherein the processing the write request causes a bit to be set in a bitmap for a respective chunk of the first cache, wherein setting the bit includes allocating the first cache as a plurality of chunks having a granularity, and mapping the plurality of chunks to the bitmap according to the granularity, wherein the processing, when a number of changes made to the first cache meets a first change threshold, causes a decreasing of the granularity of the chunks at which the bitmap is allocated, and resetting set bits in the bitmap according to the decreased granularity of the chunks;

determining the first node is no longer in the disconnected state; and dumping from the second cache at a second node portions of the second cache at the second node inconsistent with changes made to the first cache at the first node at times the first node was in the disconnected state, wherein the dumping including comparing the changed portions of the first cache to respective portions of the second cache to determine the portions of the second cache that are inconsistent with the changes made to the first cache, and removing from the second cache the portions of the second cache that are inconsistent with the changes made to the first cache.

5. The system of claim 4 wherein decreasing the granularity of the chunks at which the bitmap is allocated comprises increasing the chunk size; and wherein resetting set bits in the bitmap according to the decreased granularity of the chunks comprises setting bits for respective increased-sized chunks according to whether the increased-sized chunk represents one or more chunks for which the bit was set in the bitmap.

6. The system of claim 4 wherein the number of changes made to the first cache at the first node exceeds a second change threshold, the computer program code further configured to cause the computer to perform the operation of dumping from the second cache at the second node all portions of the second cache at the second node.

7. A computer program product including a non-transitory computer-readable storage medium having computer program code encoded thereon that when executed on a processor of a computer causes the computer to re-sync a distributed cache after node disconnection, the computer program code comprising:

computer program code for stopping cache coherency among a plurality of nodes at times a first node among the plurality of nodes is in a disconnected state, wherein the stopping includes a pause in sending an update message to a second node among the plurality of nodes while in the disconnected state, wherein the pause causes changes made to the first cache which are not updated in a second cache at the second node during the disconnected state, the first cache and the second cache comprise a distributed write-through cache;

processing a write request received from an application at the first node at times the first node is in the disconnected state, wherein the processing the write request causes a bit to be set in a bitmap for a respective chunk of the first cache, wherein setting the bit includes allocating the first cache as a plurality of chunks having a granularity, and mapping the plurality of chunks to the bitmap according to the granularity, wherein the processing, when a number of changes made to the first cache meets a first change threshold, causes a decreasing of the granularity of the chunks at which the bitmap is allocated, and resetting set bits in the bitmap according to the decreased granularity of the chunks;

computer program code for determining the first node is no longer in the disconnected state; and computer program code for dumping from the second cache at a second node portions of the second cache at the second node inconsistent with changes made to the first cache at the first node at times the first node was in the disconnected state, wherein the dumping including comparing the changed portions of the first cache to respective portions of the second cache to determine the portions of the second cache that are inconsistent with the changes made to the first cache, and removing from the second cache the portions of the second cache that are inconsistent with the changes made to the first cache.

8. The computer program product of claim 7 wherein decreasing the granularity of the chunks at which the bitmap is allocated comprises increasing the chunk size; and wherein resetting set bits in the bitmap according to the decreased granularity of the chunks comprises setting bits for respective increased-sized chunks according to whether the increased-sized chunk represents one or more chunks for which the bit was set in the bitmap.

9. The computer program product of claim 7 wherein the number of changes made to the first cache at the first node exceeds a second change threshold, the method further comprising dumping from the second cache at the second node all portions of the second cache at the second node.

* * * * *